United States Patent
Honda

(10) Patent No.: US 8,836,577 B2
(45) Date of Patent: Sep. 16, 2014

(54) WIRELESS SENSOR NETWORK SYSTEM, INFORMATION GATHERING APPARATUS, SENSOR DEVICE, AND CONNECTION METHOD FOR USE IN WIRELESS SENSOR NETWORK

(75) Inventor: Atsushi Honda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 834 days.

(21) Appl. No.: 12/748,505

(22) Filed: Mar. 29, 2010

(65) Prior Publication Data

US 2010/0245173 A1    Sep. 30, 2010

(30) Foreign Application Priority Data

Mar. 30, 2009   (JP) .................................. 2009-80903

(51) Int. Cl.
*H04Q 9/00* (2006.01)
*H04W 52/02* (2009.01)
*H04B 7/06* (2006.01)
*H04B 7/08* (2006.01)

(52) U.S. Cl.
CPC ............. *H04Q 9/00* (2013.01); *H04Q 2209/40* (2013.01); *H04Q 2209/50* (2013.01); *H04B 7/0617* (2013.01); *H04B 7/086* (2013.01); *H04W 52/0219* (2013.01)
USPC ....................................................... 342/372

(58) Field of Classification Search
USPC ....................................................... 342/372
See application file for complete search history.

(56) References Cited

U.S. PATENT DOCUMENTS

| 2004/0029622 | A1* | 2/2004 | Laroia et al. ................... 455/574 |
| 2007/0049317 | A1* | 3/2007 | Qi et al. ......................... 455/522 |
| 2008/0137585 | A1 | 6/2008 | Loyola et al. |
| 2009/0034539 | A1* | 2/2009 | Kawai et al. ................... 370/400 |
| 2009/0040107 | A1 | 2/2009 | Yun et al. |

FOREIGN PATENT DOCUMENTS

| EP | 1202587 | 5/2002 |
| JP | 2004-289328 | 10/2004 |
| JP | 2008-131649 | 6/2008 |

OTHER PUBLICATIONS

English Translation of JP 2004-289328 A.*
S. Basagni, A distance routing effect algorithm for mobility (DREAM), Proceedings of the 4th annual ACM/IEEE international conference on Mobile computing and networking, p. 76-84, 1998.*
Request to Send (RTS). (1999). In Focal Dictionary of Telecommunications, Focal Press. Retrieved from http://www.credoreference.com/entry/bhfidt/request_to_send_rts.*

(Continued)

*Primary Examiner* — Jack W Keith
*Assistant Examiner* — Fred H Mull
(74) *Attorney, Agent, or Firm* — Meyers Wolin, LLC

(57) ABSTRACT

A wireless sensor network system includes a plurality of sensor devices each having a non-directional antenna, and an information gathering apparatus having an adaptive array antenna and gathering information detected by the plurality of sensor devices. Each sensor device includes a transmitter to transmit a transmission request for connecting to the information gathering apparatus. The information gathering apparatus includes, a first directivity-changing section that, when the information gathering apparatus receives a transmission request from an unconnected sensor device, performs one of changing the adaptive array antenna to be non-directional, and changing a directivity of the adaptive array antenna, and that receives a signal transmitted from one of the unconnected sensor device and the unconnected sensor device and a connected sensor device, and a second directivity-changing section to change the directivity in accordance with a reception state of the signal.

19 Claims, 14 Drawing Sheets

(56) References Cited

OTHER PUBLICATIONS

Whether. (2000). In Collins English Dictionary. Retrieved from http://www.credoreference.com/entry/hcengdict/whether.*
RTS. (2001). In Hargrave's Communications Dictionary, Wiley. Retrieved from http://www.credoreference.com/entry/hargravecomms/rts.*

R. Tang et al., Phased Arrays, in Antenna Engineering Handbook, R.C. Johnson (Editor), p. 20-5, 1993.*
European search report and the European search opinion issued for corresponding European Patent Application No. 10158048.8 dated Jun. 11, 2013.
Decision of Refusal issued for corresponding Japanese Patent Application No. 2009-080903, dispatched Jun. 18, 2013, with partial English translation.

* cited by examiner

FIG. 5A

| FRAME CONTROL | DURATION | RECEIVER ADDRESS | TRANSMITTER ADDRESS | RTSs | FCS |

FIG. 5B

| FRAME CONTROL | DURATION | RECEIVER ADDRESS | FCS |

FIG. 5C

| FRAME CONTROL | DURATION | RECEIVER ADDRESS | TRANSMITTER ADDRESS | SEQUENCE CONTROL | DATA | FCS |

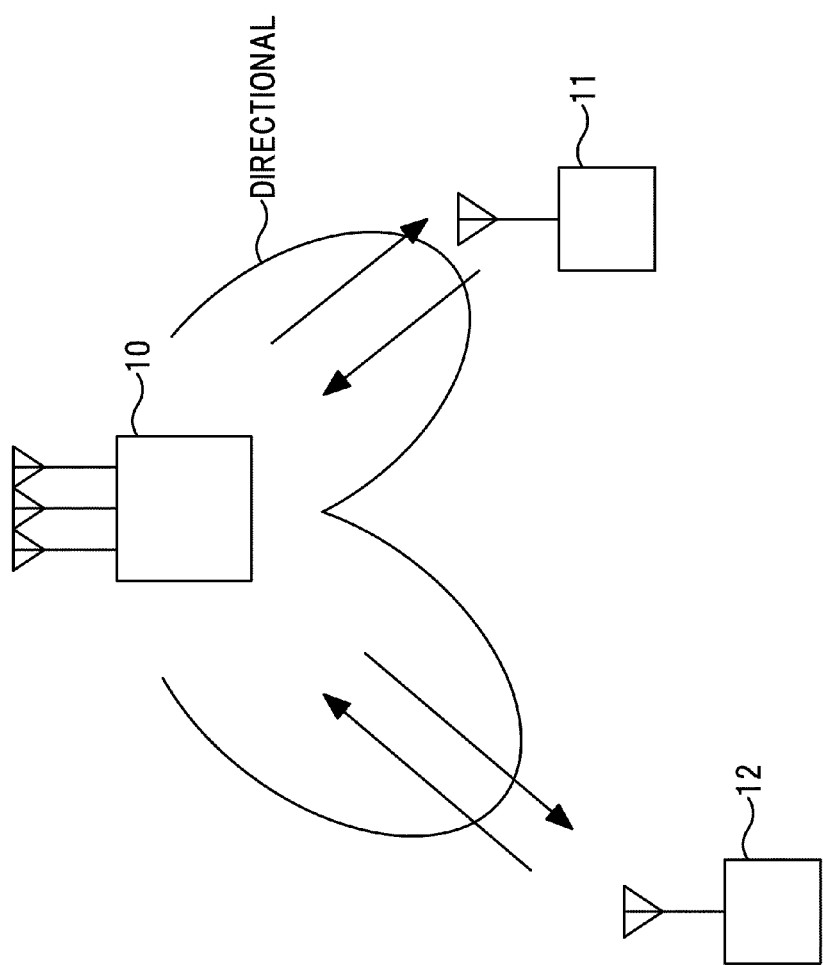

WIRELESS SENSOR NETWORK SYSTEM, INFORMATION GATHERING APPARATUS, SENSOR DEVICE, AND CONNECTION METHOD FOR USE IN WIRELESS SENSOR NETWORK

CROSS-REFERENCE TO RELATED APPLICATION

This application is based upon and claims the benefit of priority of the prior Japanese Patent Application No. 2009-80903, filed on Mar. 30, 2009, the entire contents of which are incorporated herein by reference.

FIELD

The present invention relates to wireless sensor network systems that wirelessly connect a plurality of sensor devices having non-directional antennas and information gathering apparatuses having adaptive array antennas, information gathering apparatuses, sensor devices, and connection methods in wireless sensor networks.

BACKGROUND

Recently, the development of a wireless sensor network, in which sensor terminals formed of small wireless devices with sensors gather information such as ambient temperature, humidity, velocity, and images and transmit the information through multi-hop networking, has advanced.

It is generally assumed that the sensor terminals may be used outdoors, for example, at farms or in the city, and the power consumed by the sensor terminals needs to be reduced. Some methods for reducing the power consumption of the sensor terminals include reducing the power consumed by the devices in the sensor terminals or providing a sleep mode. However, in order to further reduce the power consumption, adaptive array antennas used for, for example, cellular systems may be introduced.

An adaptive array antenna in such a cellular system includes a plurality of antenna elements installed in a base station, and the beam directivity of the antenna to a terminal is increased while the directivity to interference sources is reduced to "nulls" (portions in which the sensitivity in the directivity pattern is minimized) by controlling the array weights (amplitudes and phases) of the antenna elements during signal communication. With this, signal transmission quality of the system may be increased.

Technologies for improving communication performance and reducing power consumption in wireless sensor networks by controlling the directivity of antennas have been developed to date (for example, see Japanese Unexamined Patent Application Publication No. 2004-289328).

According to a known technology, a transmitter first transmits a Request-to-Send (RTS) signal at a low transmission rate using a non-directional antenna, and a receiver receives the RTS signal using a non-directional antenna. Next, the receiver transmits a Clear-to-Send (CTS) signal to the transmitter at a low transmission rate, and switches from the non-directional antenna to a directional antenna. The transmitter that has received the CTS signal transmits data packets at a high data rate using the non-directional antenna without changing antennas. The receiver receives the data using the directional antenna.

According to the known technology, the receiver increases the directivity of the antenna to the transmitter after the RTS signal and the CTS signal are exchanged. With this, data may be transmitted at a high rate. However, this technology is intended for one-to-one communication between the receiver and the transmitter, and the case where a new transmitter starts communication with the receiver during the one-to-one communication is not considered. Therefore, the receiver may not receive RTS signals from other new transmitters and the like during the one-to-one communication using the directional antenna, and may not form a network.

SUMMARY

According to an aspect of the embodiments discussed herein, a wireless sensor network system includes a plurality of sensor devices each having a non-directional antenna, and an information gathering apparatus having an adaptive array antenna and gathering information detected by the plurality of sensor devices. The wireless sensor network system wirelessly connects the plurality of sensor devices to the information gathering apparatus, and each sensor device includes a transmitter to transmit a transmission request for connecting to the information gathering apparatus. The information gathering apparatus includes, a first directivity-changing section configured to set the adaptive array antenna to be non-directional and to change a directivity of the adaptive array antenna in accordance with whether the transmission request was transmitted from at least one of an unconnected sensor device and an unconnected sensor device via a connected sensor device. A further embodiment includes the directivity-changing section further configured to change the directivity of the adaptive array antenna in accordance with a reception state of the signal transmitted from the at least one of the unconnected sensor device and the unconnected sensor device via the connected sensor device.

It is to be understood that both the foregoing general description and the following detailed description are exemplary and explanatory and are not restrictive of the embodiments, as claimed.

BRIEF DESCRIPTION OF DRAWINGS

FIGS. 5A to 5C illustrate formats of RTS packets, CTS packets, and data packets, respectively.

FIG. 14 illustrates the coordinator, whose array antenna is set to have a directivity facing a plurality of sensor devices.

DESCRIPTION OF EMBODIMENTS

<Configuration of Wireless Sensor Network System>

Figure 1:
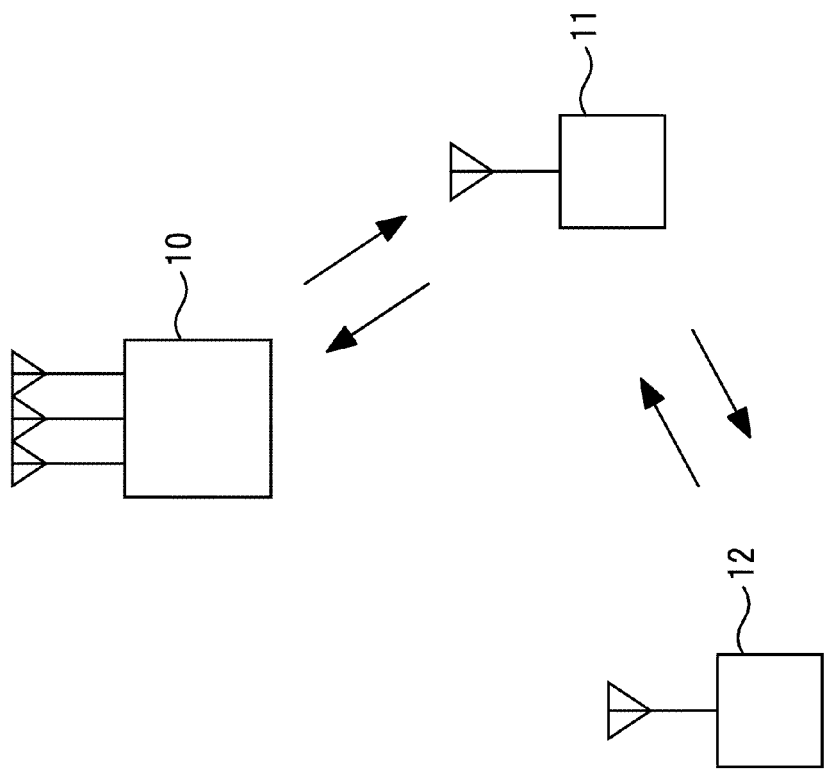
FIG. 1 illustrates a configuration of a wireless sensor network system according to an embodiment of the present invention.

FIG. 1 illustrates a configuration of a wireless sensor network system according to an embodiment of the present invention. In FIG. 1, a coordinator 10 is an information gathering apparatus and includes an adaptive array antenna whose directivity may be changed. Sensor devices 11 and 12 each include a non-directional antenna so as to reduce the power consumption thereof.

The coordinator 10 and the sensor devices 11 and 12 are wirelessly connected by establishing communication via exchange of RTS packets and CTS packets over a wireless LAN. Herein, the sensor device 11 adjacent to the coordinator 10 is directly wirelessly connected to the coordinator 10. The sensor device 12 remote from the coordinator 10 may be directly wirelessly connected to the coordinator 10, or may be wirelessly connected to the coordinator 10 via the sensor device 11. The coordinator 10 is included in a network by being connected to other coordinators in a wired or wireless manner.

<Configuration of Coordinator>

Figure 2:
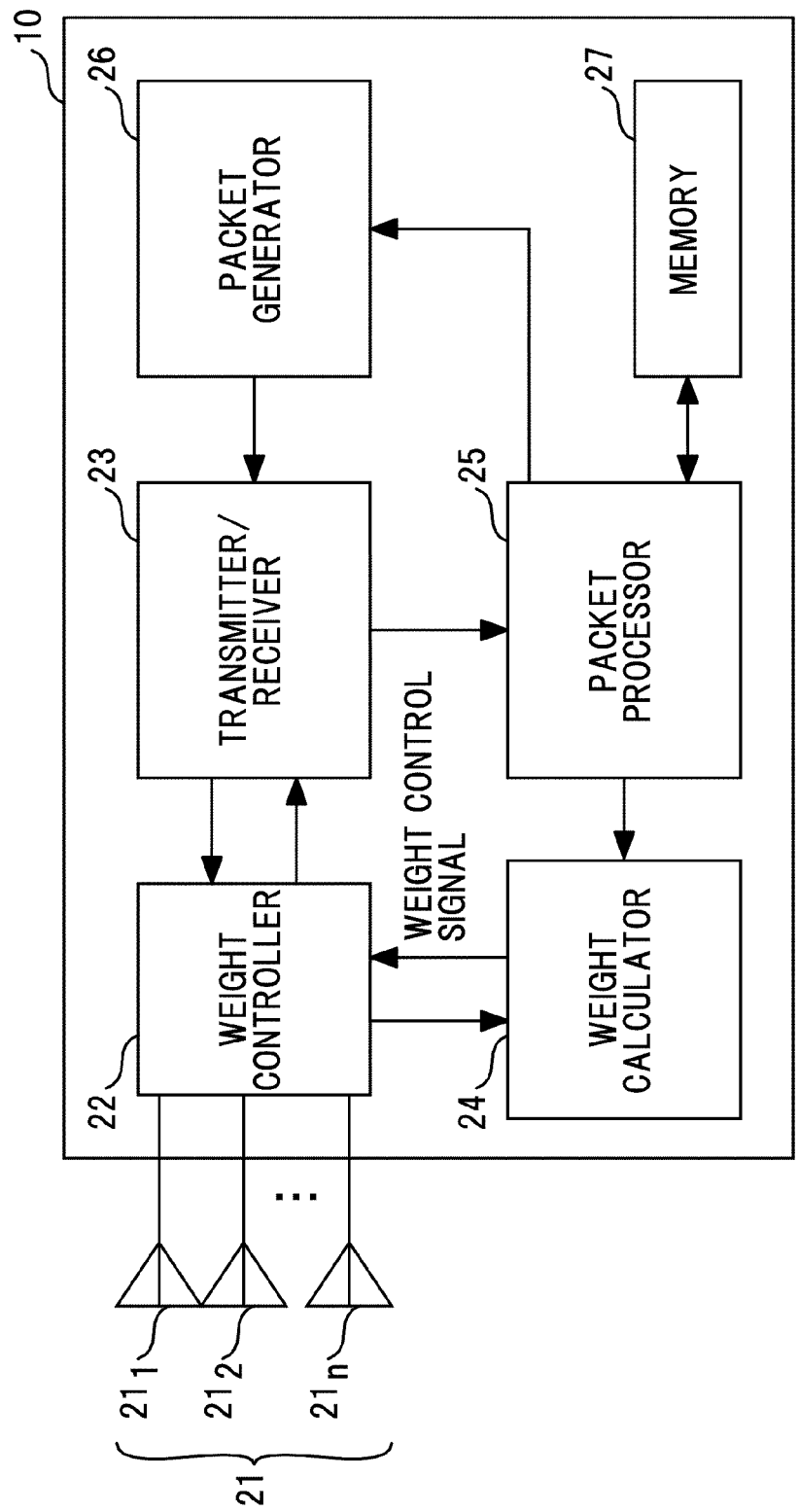
FIG. 2 is a block diagram of a coordinator according to an embodiment of the present invention.

FIG. 2 is a block diagram of the coordinator 10 according to an embodiment. In FIG. 2, antenna elements $21_1$ to $21_n$ included in an array antenna 21 are connected to a transmitter/receiver 23 via a weight controller 22. Signals received by the array antenna 21 are weighted in the weight controller 22 for each antenna element, subjected to additive synthesis, and supplied to the transmitter/receiver 23. Signals transmitted from the transmitter/receiver 23 are weighted in the weight controller 22 for each antenna element, and output from the antenna elements $21_1$ to $21_n$.

A weight calculator 24 generates weights being applied to the signals received by the antenna elements $21_1$ to $21_n$ using an existing algorithm such as the Minimum Mean Square Error (MMSE) or the Constant Modulus Algorithm (CMA) based on the signals received by the antenna elements $21_1$ to $21_n$, and supplies the weights to the weight controller 22. This improves the Signal to Interference power Ratio (SIR) characteristic of the received signals. Moreover, the weight calculator 24 generates weights being applied to the signals being transmitted from the antenna elements $21_1$ to $21_n$ when the signals are output, and supplies the weights to the weight controller 22.

The transmitter/receiver 23 demodulates the received signals supplied from the weight controller 22, and supplies the resultant received packets to a packet processor 25. In addition, the transmitter/receiver 23 modulates packets being transmitted such as data packets, RTS packets, and CTS packets supplied from a packet generator 26, and supplies the resultant signals to the weight controller 22.

The packet processor 25 determines whether the received packets supplied from the transmitter/receiver 23 are RTS packets, CTS packets, or data packets, and processes the packets accordingly. When the received packets are data packets, for example, the packet processor supplies the packets to a succeeding circuit so as to transmit the packets to other coordinators. When the received packets are RTS packets, the packet processor issues instructions to the packet generator 26 to respond to the RTS. Moreover, when the RTS packets include information of other sensor devices (for example, 12) in addition to that of the source sensor device (for example, 11), the information of the other sensor devices is retained in a memory 27, and the packet processor notifies the weight calculator 24 accordingly. Furthermore, when the received packets are CTS packets, processes for receiving CTS packets are performed.

<Configuration of Sensor Device According to First Embodiment>

Figure 3:
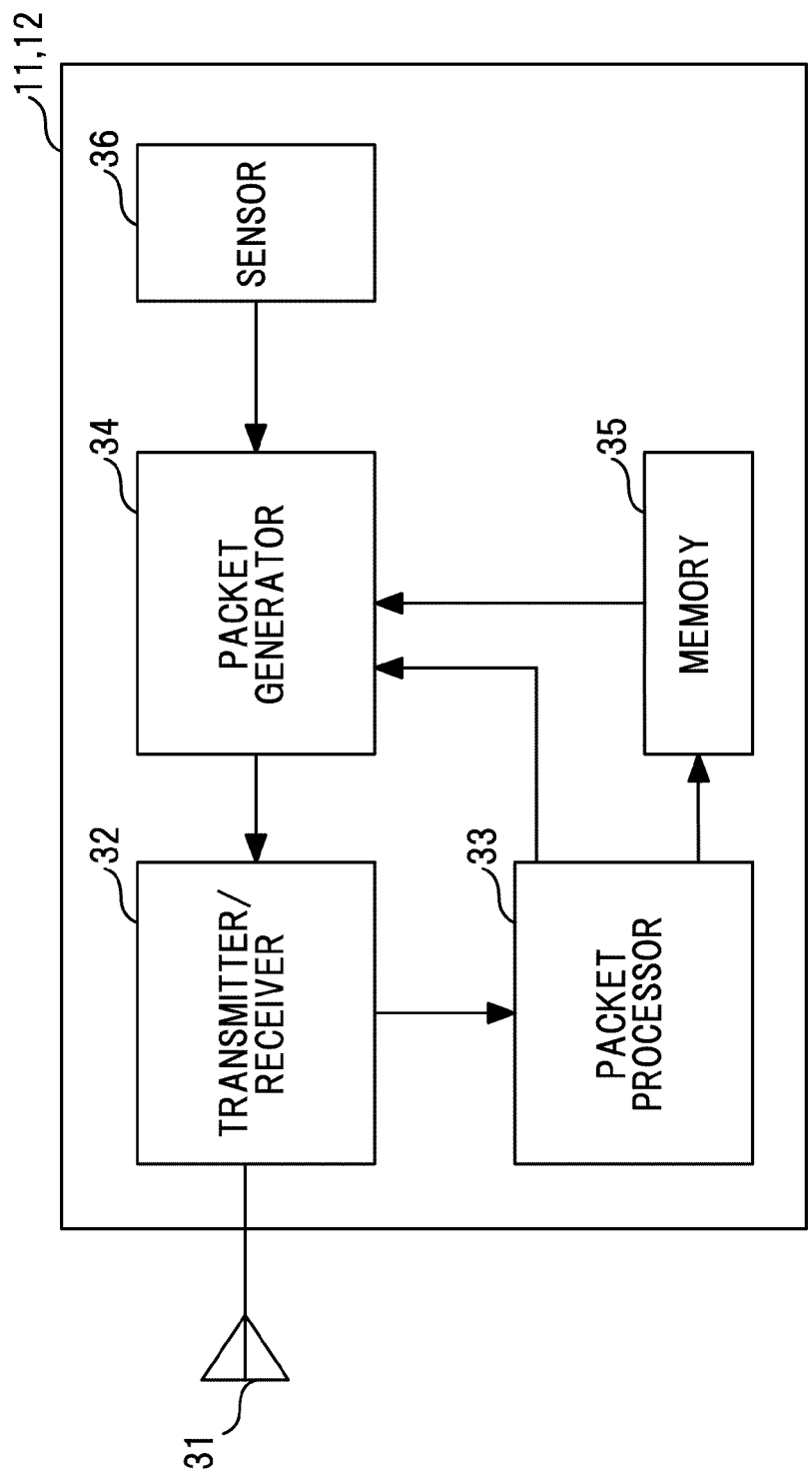
FIG. 3 is a block diagram of a sensor device according to a first embodiment of the present invention.

FIG. 3 is a block diagram of the sensor device 11 according to a first embodiment of the present invention. The sensor device 12 has the same configuration. In FIG. 3, an antenna 31 is connected to a transmitter/receiver 32. Signals received by the antenna 31 are supplied to the transmitter/receiver 32, and signals transmitted from the transmitter/receiver 32 are output from the antenna 31.

The transmitter/receiver 32 demodulates the supplied received signals, and supplies the resultant received packets to a packet processor 33. In addition, the transmitter/receiver 32 modulates packets being transmitted such as RTS packets, CTS packets, and data packets supplied from a packet generator 34, and transmits the resultant signals from the antenna 31.

The packet processor 33 determines whether the received packets supplied from the transmitter/receiver 32 are RTS packets, CTS packets, or data packets, and processes the packets accordingly. When the received packets are RTS packets from the coordinator 10 or the other sensor device 12, the packet processor issues instructions to the packet generator 34 to respond to the RTS. Moreover, when the RTS packets are transmitted from the other sensor device 12, the information of the other sensor device is retained in a memory 35. The information retained in the memory 35 is used for generating RTS packets in the packet generator 34.

The packet generator 34 generates RTS packets, CTS packets, and data packets including sensor information such as temperature, humidity, velocity and images, detected by a sensor 36 in data fields of the data packets. And the packet generator 34 supplies the packets to the transmitter/receiver 32.

<Configuration of Sensor Device According to Second Embodiment>

Figure 4:
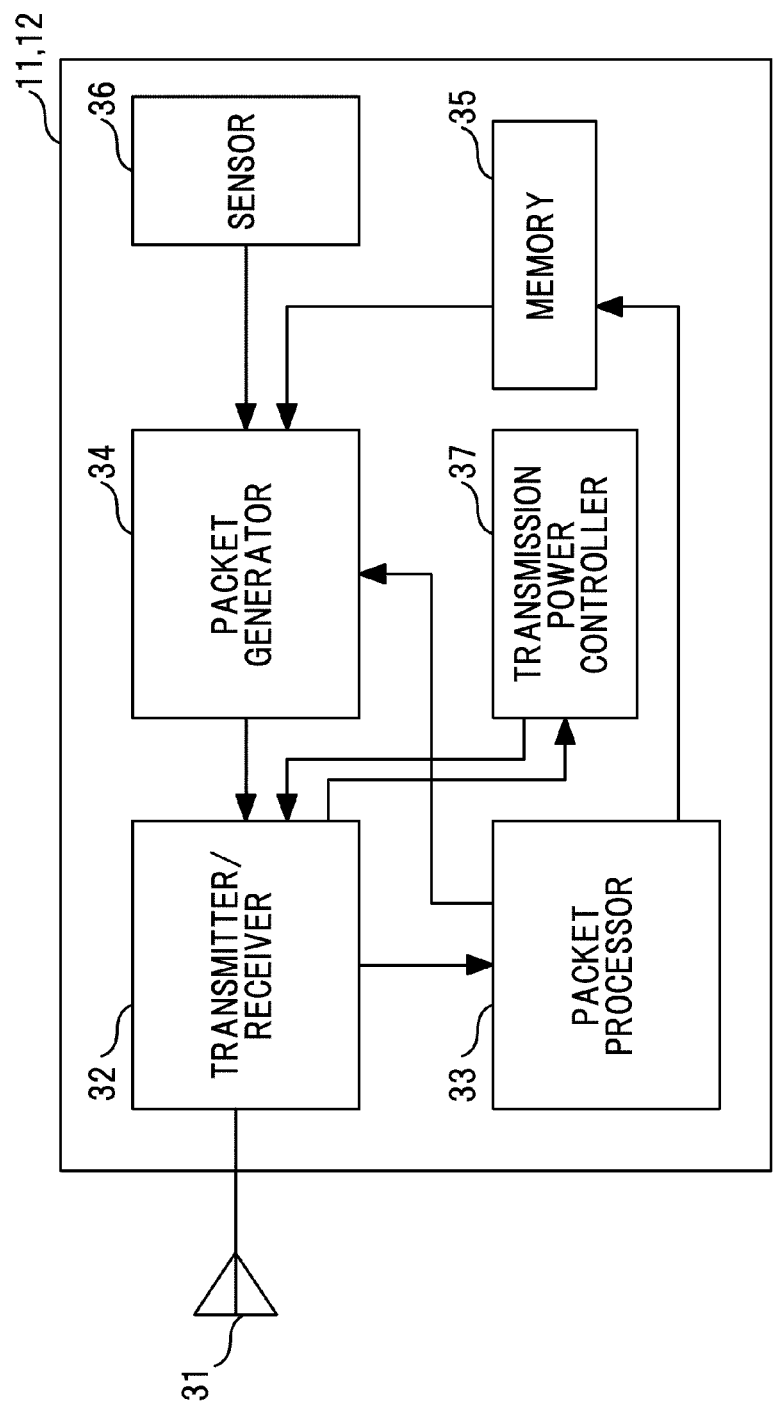
FIG. 4 is a block diagram of a sensor device according to a second embodiment of the present invention.

FIG. 4 is a block diagram of the sensor device 11 according to a second embodiment of the present invention. The sensor device 12 has the same configuration. In this embodiment, the sensor device controls the transmission power thereof.

In FIG. 4, an antenna 31 is connected to a transmitter/receiver 32. Signals received by the antenna 31 are supplied to the transmitter/receiver 32, and signals transmitted from the transmitter/receiver 32 are output from the antenna 31.

The transmitter/receiver 32 demodulates the supplied received signals, and supplies the resultant received packets to a packet processor 33. In addition, the transmitter/receiver 32 modulates packets being transmitted such as RTS packets, CTS packets, and data packets, supplied from a packet generator 34. The transmitter/receiver 32 transmits the resultant signals from the antenna 31. Moreover, the transmitter/receiver 32 supplies a Received Signal Strength Indicator (RSSI) to a transmission power controller 37.

The packet processor 33 determines whether the received packets supplied from the transmitter/receiver 32 are RTS packets, CTS packets, or data packets, and processes the packets accordingly. When the received packets are RTS packets from the coordinator 10 or the other sensor device 12, the packet processor issues instructions to the packet generator 34 to respond to the RTS. Moreover, when the RTS packets are transmitted from the other sensor device 12, the information of the other sensor device is retained in a memory 35. The information retained in the memory 35 is used for generating RTS packets in the packet generator 34.

The packet generator 34 generates RTS packets, CTS packets, and data packets including sensor information such as temperature, humidity, velocity and images, detected by a sensor 36 in data fields of the data packets. And the packet generator supplies the packets to the transmitter/receiver 32.

The transmission power controller 37 controls the transmission power of the transmitter/receiver 32 such that the transmission power is increased as the RSSI is reduced in accordance with the RSSI supplied from the transmitter/receiver 32. The transmission power of the transmitter/receiver 32 may be controlled based on the SIR instead of the RSSI.

<Packet Format>

FIGS. 5A to 5C illustrate formats of RTS packets, CTS packets, and data packets, respectively. As illustrated in FIG. 5A, an RTS packet includes a frame control field, a duration field, a receiver address field, a transmitter address field, a field for RTSs from other terminals, and a Frame Check Sequence (FCS) field. The frame control field includes various control information including the type of the packet such as RTS, CTS, or data. The duration field includes a specific period of time during which the wireless line is used.

The receiver address field includes an address of a receiver serving as an RTS target. The transmitter address field includes an address of a transmitter serving as an RTS source. The FCS field includes an error correcting code.

As illustrated in FIG. 5B, a CTS packet includes a frame control field, a duration field, a receiver address field, and a FCS field. The frame control field includes various control information including the type of the packet such as RTS, CTS, or data. The duration field includes a specific period of time during which the wireless line is used. The receiver address field includes an address of a receiver serving as a CTS target. The FCS field includes an error correcting code.

As illustrated in FIG. 5C, a data packet includes a frame control field, a duration field, a receiver address field, a transmitter address field, a sequence control field, a data field, and an FCS field. The frame control field includes various control information including the type of the packet such as RTS, CTS, or data. The duration field includes a specific period of time during which the wireless line is used. The receiver address field includes an address of a receiver serving as a data target. The transmitter address field includes an address of a transmitter serving as a data source. The sequence control field includes a sequence number and a fragment number of the divided data. The data field includes sensor information such as temperature, humidity, velocity, and images. Moreover, the data field may include RTSs received from other sensor devices directly set in the field. The FCS field includes an error correcting code.

<Flow Chart of Process Performed by Coordinator>

Figure 6:
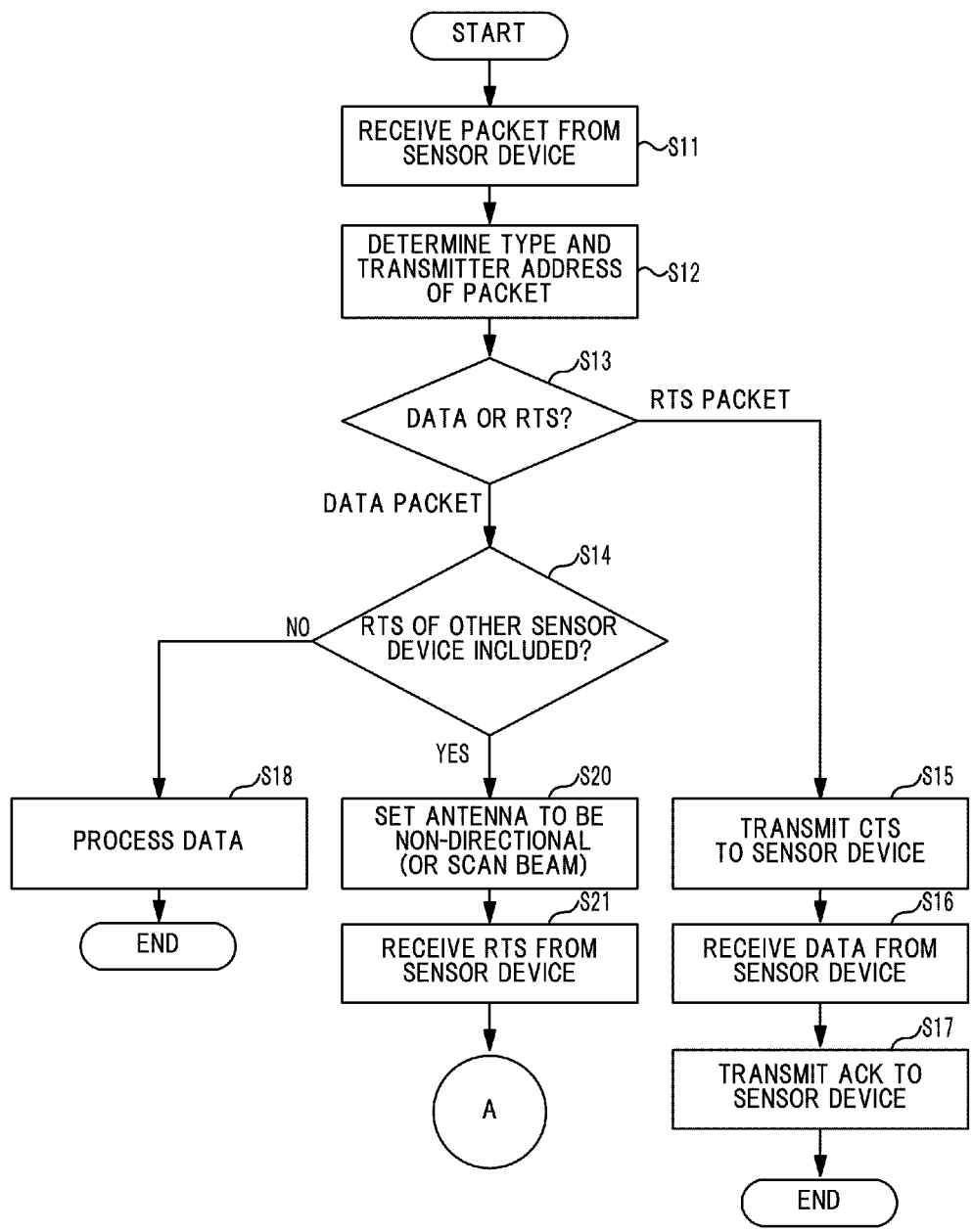
FIG. 6 is a flow chart illustrating processes performed by the coordinator when the coordinator receives packets according to an embodiment of the present invention.
Figure 7:
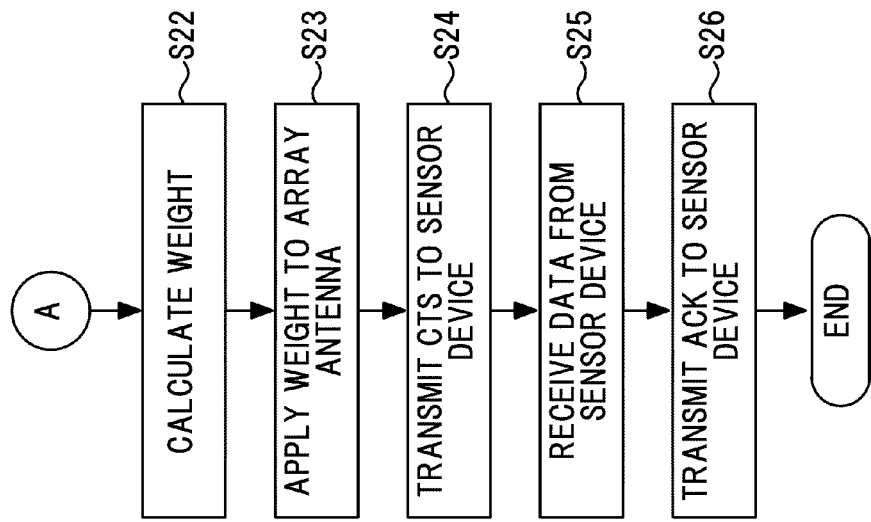
FIG. 7 is a flow chart illustrating the processes performed by the coordinator when the coordinator receives packets according to the embodiment of the present invention.

FIGS. 6 and 7 are flow charts illustrating processes performed by the coordinator 10 when the coordinator 10 receives packets according to an embodiment of the present invention.

In Step S11 illustrated in FIG. 6, the coordinator 10 receives packets from a sensor device (hereinafter, the sensor device 11). The type of the packets and the transmitter address are determined in Step S12, and it is determined whether the received packets are data packets or RTS packets in Step S13. When the received packets are data packets, it is determined that wireless communication between the coordinator 10 and the sensor device 11 has already been established, that is, the coordinator 10 and the sensor device 11 have already been connected, and the process proceeds to Step S14. When the received packets are RTS packets, it is determined that the coordinator 10 and the sensor device 11 are not connected, and the process proceeds to Step S15.

In Step S14, it is determined whether or not the data fields of the received data packets include RTSs of other sensor devices (hereinafter, sensor device 12). With this, it may be ascertained via the sensor device 11 that has already been connected to the coordinator 10 whether or not a transmission request has been made by the other unconnected sensor device 12. When the data packets do not include an RTS of the other sensor device 12, the process proceeds to Step S18. On the other hand, when the data packets include an RTS of the other sensor device 12, the process proceeds to Step S20.

In Step S15, the coordinator 10 retains the transmitter address in the transmitter address fields of the received RTS packets in the memory 27, and generates CTS packets for the received RTS packets and transmits the generated CTS packets to the sensor device 11 specified in the transmitter address fields of the RTS packets. With this, wireless communication between the coordinator 10 and the sensor device 11 is established, and the coordinator 10 and the sensor 11 device are connected. Subsequently, the coordinator 10 receives data packets transmitted from the sensor device 11 serving as the target of the CTS packets in Step S16, and generates acknowledgements (ACK packets) for the data packets and transmits the ACK packets to the sensor device 11 specified in the transmitter address fields of the data packets in Step S17. Data is communicated between the coordinator 10 and the sensor device 11 in this manner.

On the other hand, in Step S18, the coordinator 10 retrieves sensor information from the data fields of the received data packets, and performs regular processes such as transferring the sensor information to other coordinators.

Alternatively, in Step S20, upon receiving the notification of the transmission request of the other unconnected sensor device 12 via the connected sensor device 11, the coordinator 10 retrieves the RTS of the other sensor device 12 from the data fields of the received data packets, and retains the transmitter address in the transmitter address field of the RTS in the memory 27. The weight calculator 24 sets the array antenna 21 to be non-directional at the timing specified in the RTS. With this, the coordinator 10 may also receive packets from the unconnected sensor device 12 in addition to the packets from the previously connected sensor device 11.

Herein, the array antenna 21 may be set to be non-directional by setting the weights for the antenna elements $21_1$ to $21_n$ to one in the weight controller 22. Alternatively, in Step S20, beam scanning may be performed by increasing the directivity in the receiving direction and rotating the receiving direction by 360°.

Next, in Step S21, the coordinator 10 receives the RTS packets from one or more sensor devices (hereinafter, sensor devices 11 and 12), and the process proceeds to Step S22 illustrated in FIG. 7. The weight calculator 24 calculates weights for optimally receiving the signals transmitted from the one or more sensor devices 11 and 12 in Step S22, and supplies the weights for the antenna elements $21_1$ to $21_n$ to the weight controller 22 in Step S23 so that the directivity, with which the signals transmitted from the one or more sensor devices 11 and 12 may be optimally received, is applied to the antenna. With such directivity, the coordinator 10 may directly wirelessly communicate with the sensor devices 11 and 12 with excellent communication performance and low power.

Subsequently, in Step S24, the coordinator 10 generates CTS packets for the received RTS packets, and transmits the CTS packets to the sensor devices 11 and 12 specified in the transmitter address fields of the RTS packets. Next, the coordinator 10 receives data packets transmitted from the sensor devices 11 and 12 serving as the targets of the CTS packets in Step S25, and generates ACK packets for the data packets and transmits the ACK packets to the sensor devices 11 and 12 specified in the transmitter address fields of the data packets in Step S26.

When the coordinator 10 receives RTS packets from the plurality of sensor devices 11 and 12 in Step S21, Steps S24 to S26 are repeated in accordance with the number of the sensor devices 11 and 12 from which the RTS packets are received.

<Flow Chart of Process Performed by Sensor Device>

Figure 8:
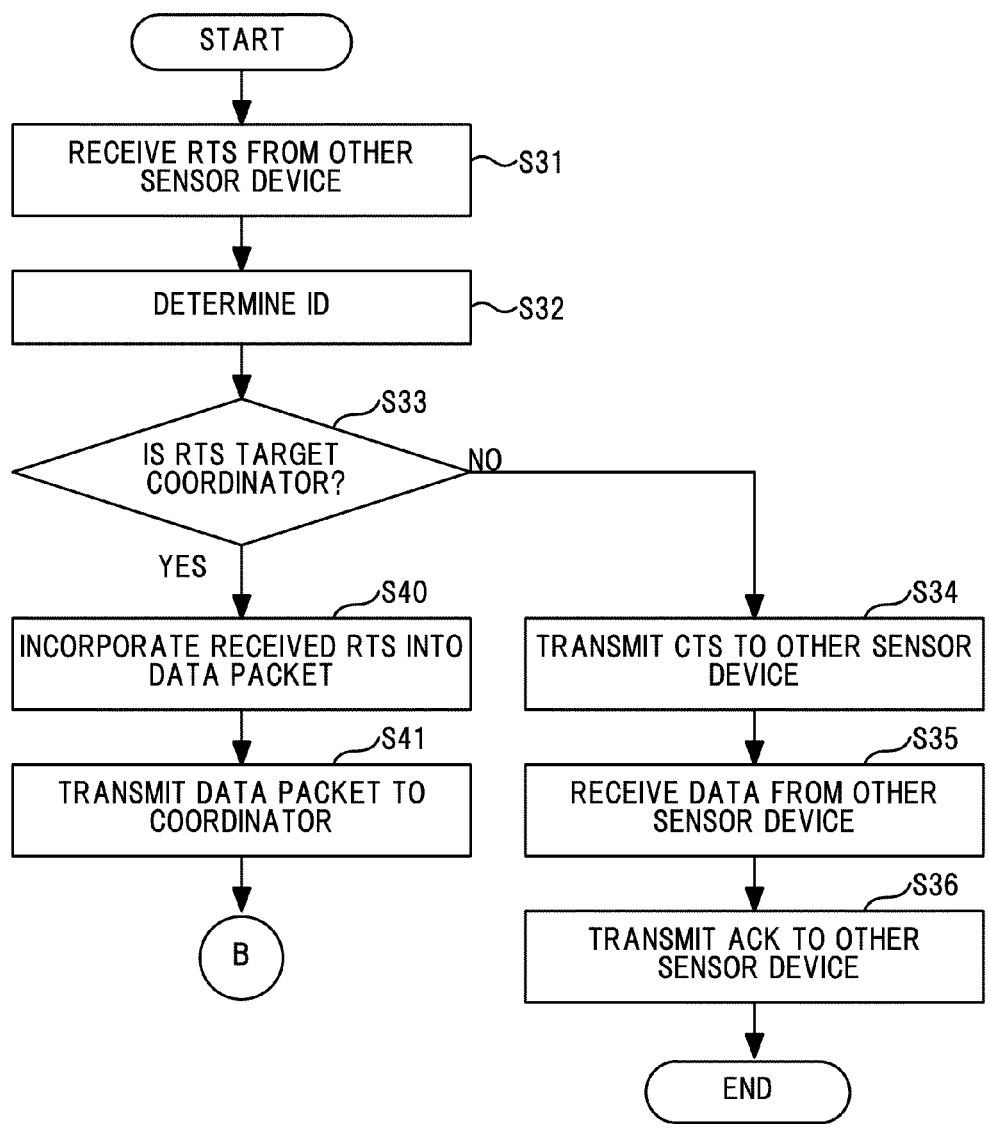
FIG. 8 is a flow chart illustrating processes performed by the sensor device when the sensor device receives RTS packets according to an embodiment of the present invention.
Figure 9:
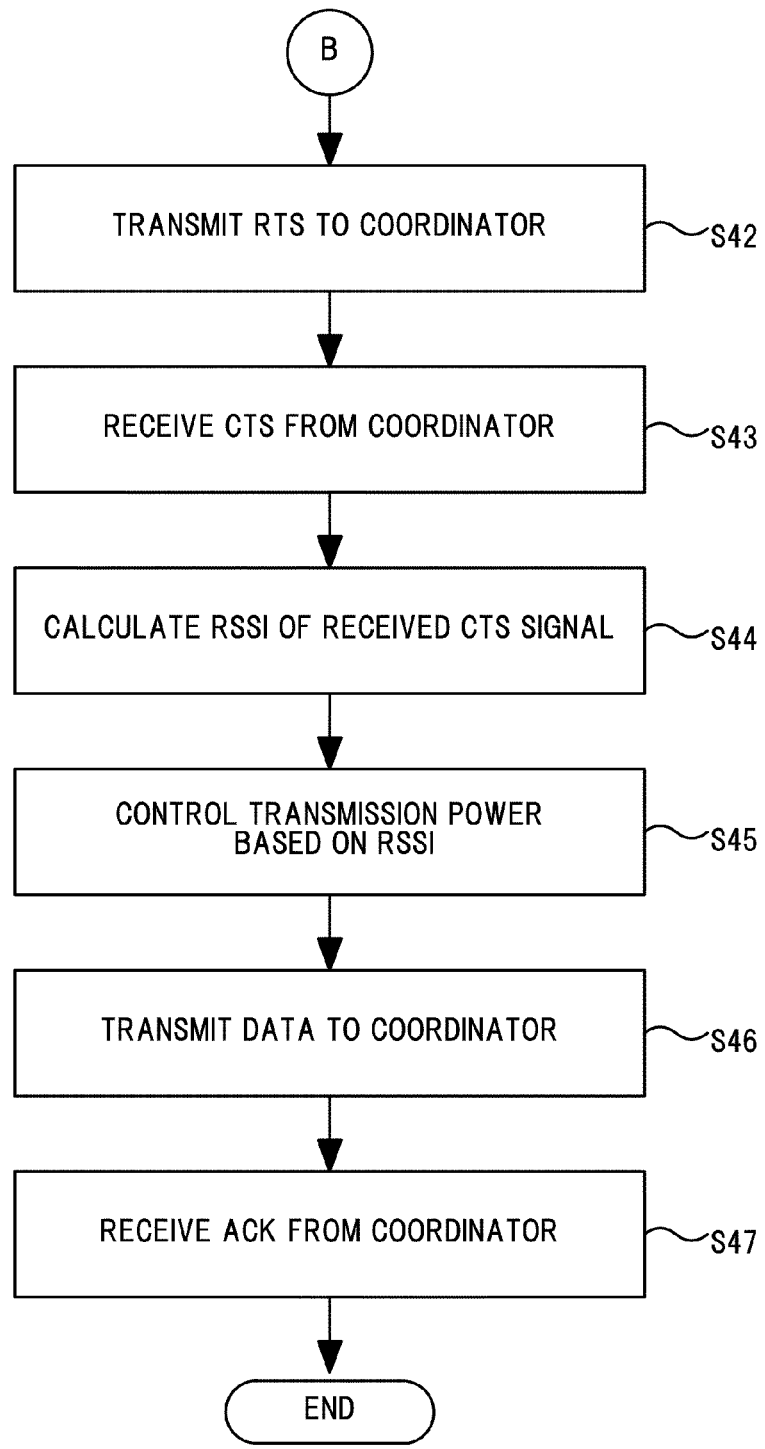
FIG. 9 is a flow chart illustrating the processes performed by the sensor device when the sensor device receives RTS packets according to the embodiment of the present invention.

FIGS. 8 and 9 are flow charts illustrating processes performed by the sensor device 11 or 12 when the sensor device receives RTS packets according to an embodiment of the present invention. Herein, the processes are performed by the sensor device 11. The sensor device 11 has already transmitted an RTS to the coordinator 10, and has received a CTS from the coordinator 10, that is, communication between the sensor device 11 and the coordinator 10 has already been established.

In Step S31 illustrated in FIG. 8, the sensor device 11 receives RTS packets from other sensor devices (hereinafter, sensor device 12). The sensor device 11 determines the receiver address in the RTS packets in Step S32, and determines whether the receiver address indicating the target of the received RTS packets corresponds to the address of the coordinator 10 or that of the sensor device 11 in Step S33.

When the target of the received RTS packets is the sensor device 11, the sensor device 11 retains the transmitter address in the transmitter address fields of the received RTS packets in the memory 27, and generates CTS packets for the received RTS packets and transmits the CTS packets to the sensor device 12 specified in the transmitter address fields of the RTS packets in Step S34. With this, wireless communication between the sensor device 11 and the sensor device 12 is established, and the sensor device 11 and the sensor device 12 are connected. Subsequently, the sensor device 11 receives data packets transmitted from the sensor device 12 serving as the target of the CTS packets in Step S35, and generates ACK packets for the data packets and transmits the ACK packets to the sensor device 12 specified in the transmitter address fields of the data packets in Step S36. Data is communicated between the sensor device 11 and the sensor device 12 in this manner.

On the other hand, when the target of the received RTS packets is the coordinator 10 in Step S33, the process proceeds to Step S40. In Step S40, the sensor device 11 retains the transmitter address in the transmitter address fields of the received RTS packets in the memory 27. The packet generator 34 of the sensor device 11 generates data packets being transmitted from the sensor device 11 to the coordinator 10, and sets the RTS received from the other sensor device 12 in Step S31 in the data fields of the data packets. Next, the sensor device transmits the data packets to the coordinator 10 in Step S41, and the process proceeds to Step S42 illustrated in FIG. 9. With this, the coordinator 10 is notified of the transmission request from the other unconnected sensor device 12 via the previously connected sensor device 11.

The sensor device 11 transmits the RTS packets to the coordinator 10 in accordance with the transmission timing of the RTS packets in Step S42, and receives CTS packets transmitted from the coordinator 10 in Step S43. With this, wireless communication between the coordinator 10 and the sensor device 11 is established, and the coordinator 10 and the sensor device 11 are connected. At this time, when the wireless communication between the coordinator 10 and the other sensor device 12 has also been established, directivity with which the signals transmitted from the sensor devices 11 and 12 are optimally received has already been applied to the array antenna 21 of the coordinator 10.

In Step S44, the transmitter/receiver 32 calculates the RSSI of the received CTS packets, and supplies the CTS packets to the transmission power controller 37. In Step S45, the transmission power controller 37 controls the transmission power of the transmitter/receiver 32 in accordance with the RSSI. With this, the required transmission power is appropriately set in accordance with the communication state, resulting in a reduction in power consumption. When the sensor device 11 does not include the transmission power controller 37 as illustrated in FIG. 3, Steps S44 and S45 are not performed.

Next, the sensor device 11 transmits the data packets to the coordinator 10 in Step S46, and receives ACK packets for the data packets from the coordinator 10 in Step S47.

Subsequently, when the sensor device 11 receives data packets from the other sensor device 12 and the transmitter address of the received data packets is retained in the memory 27 of the sensor device 11, the sensor device 11 sets the data packets received from the other sensor device in the data fields of the data packets generated by the sensor device 11, and transmits the data packets to the coordinator <Sequence>

Herein, the coordinator 10 and the sensor device 11 illustrated in FIG. 1 are wirelessly connected by establishing communication via exchange of RTS packets and CTS packets. At this moment, even when a new sensor device 12 appears and tries to establish communication with the coordinator 10, RTS packets transmitted from the sensor device 12 are not received by the coordinator 10 since the directivity of the array antenna 21 of the coordinator 10 is weighted so as to face the sensor device 11.

When the sensor device 12 is close to the sensor device 11, the RTS packets transmitted from the sensor device 12 are received by the sensor device 11 since the antennas of the sensor devices 11 and 12 are non-directional.

Figure 10:
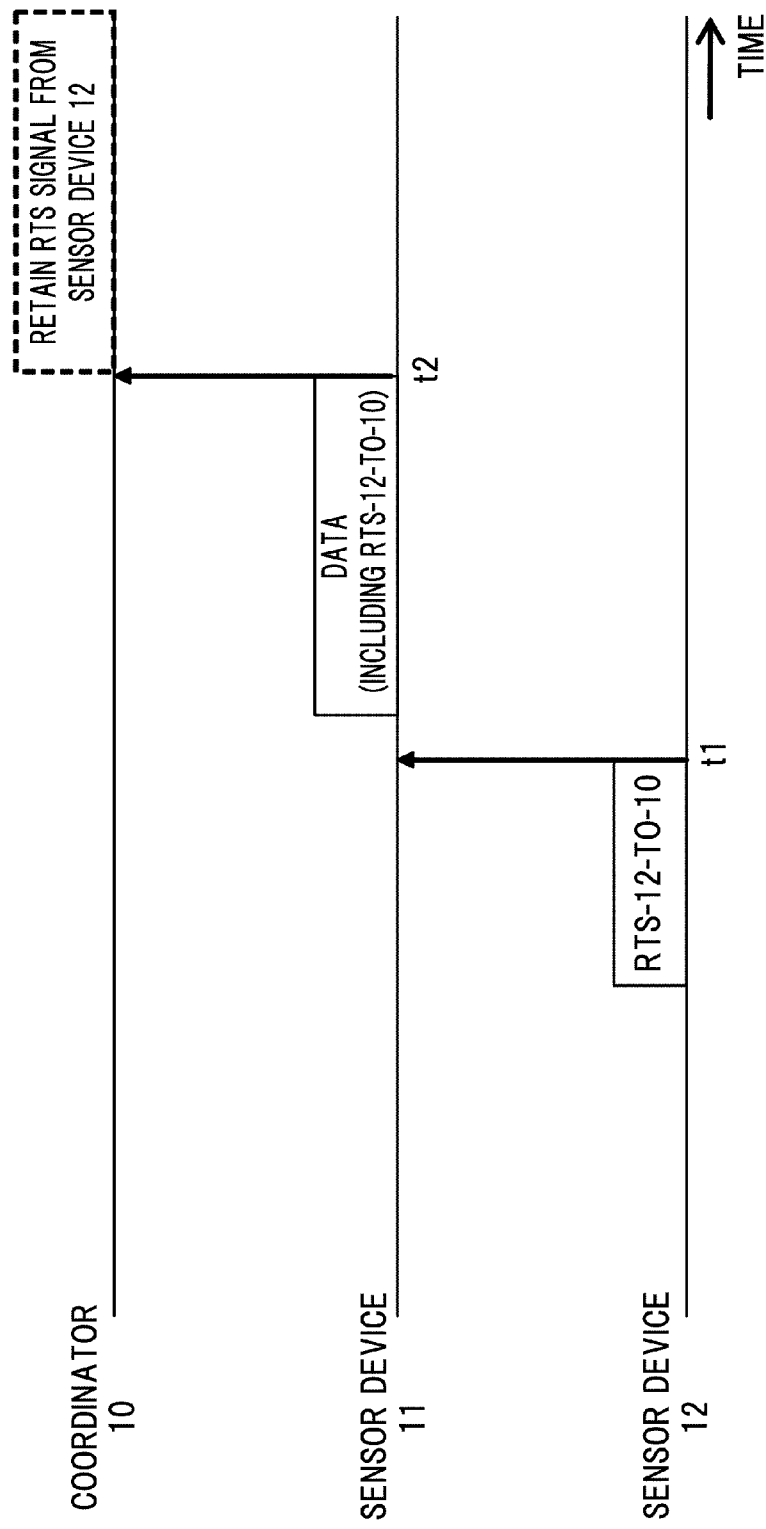
FIG. 10 illustrates a sequence of communication among the sensor devices and the coordinator.
Figure 11:
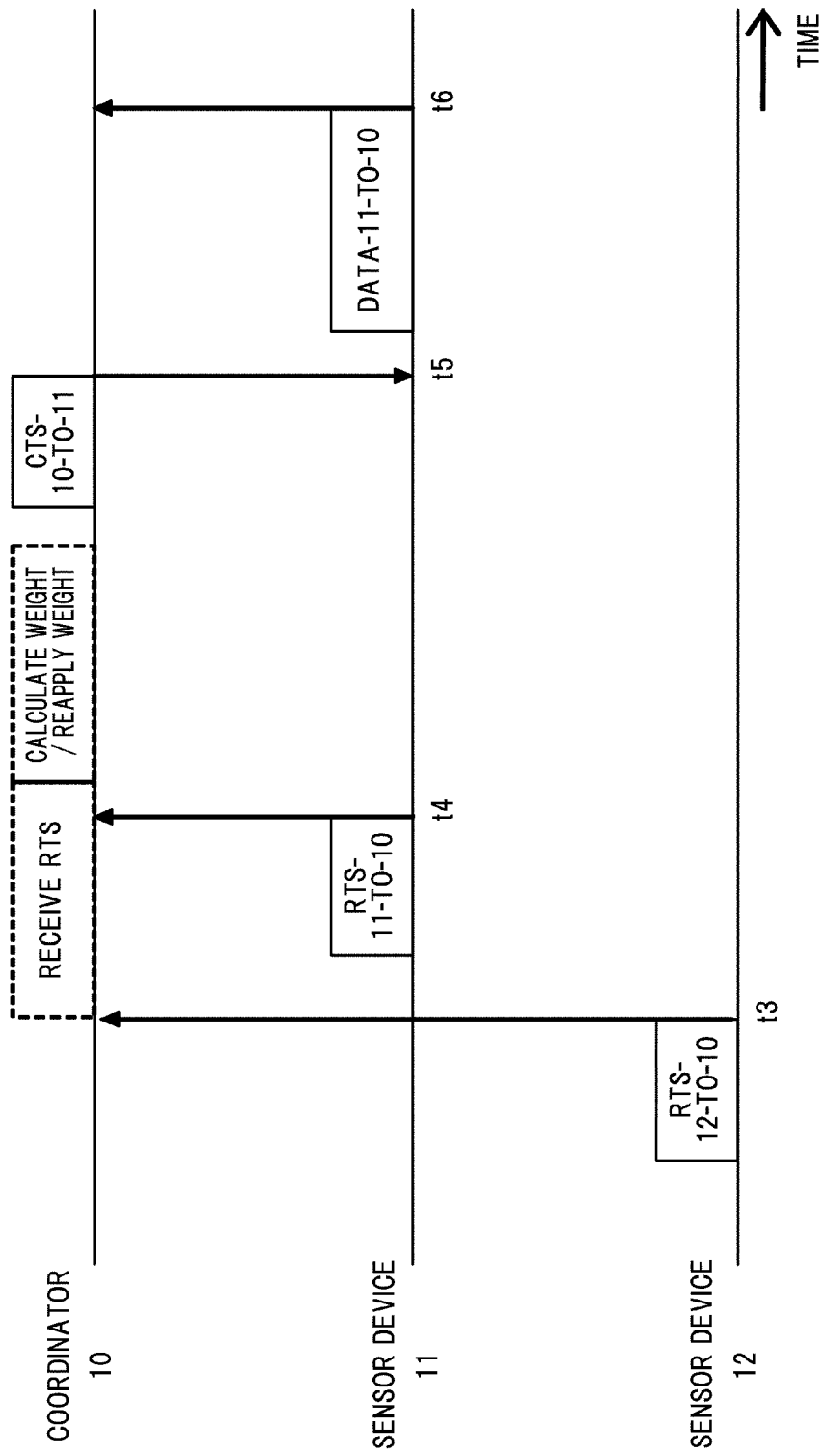
FIG. 11 illustrates the sequence of the communication among the sensor devices and the coordinator.
Figure 12:
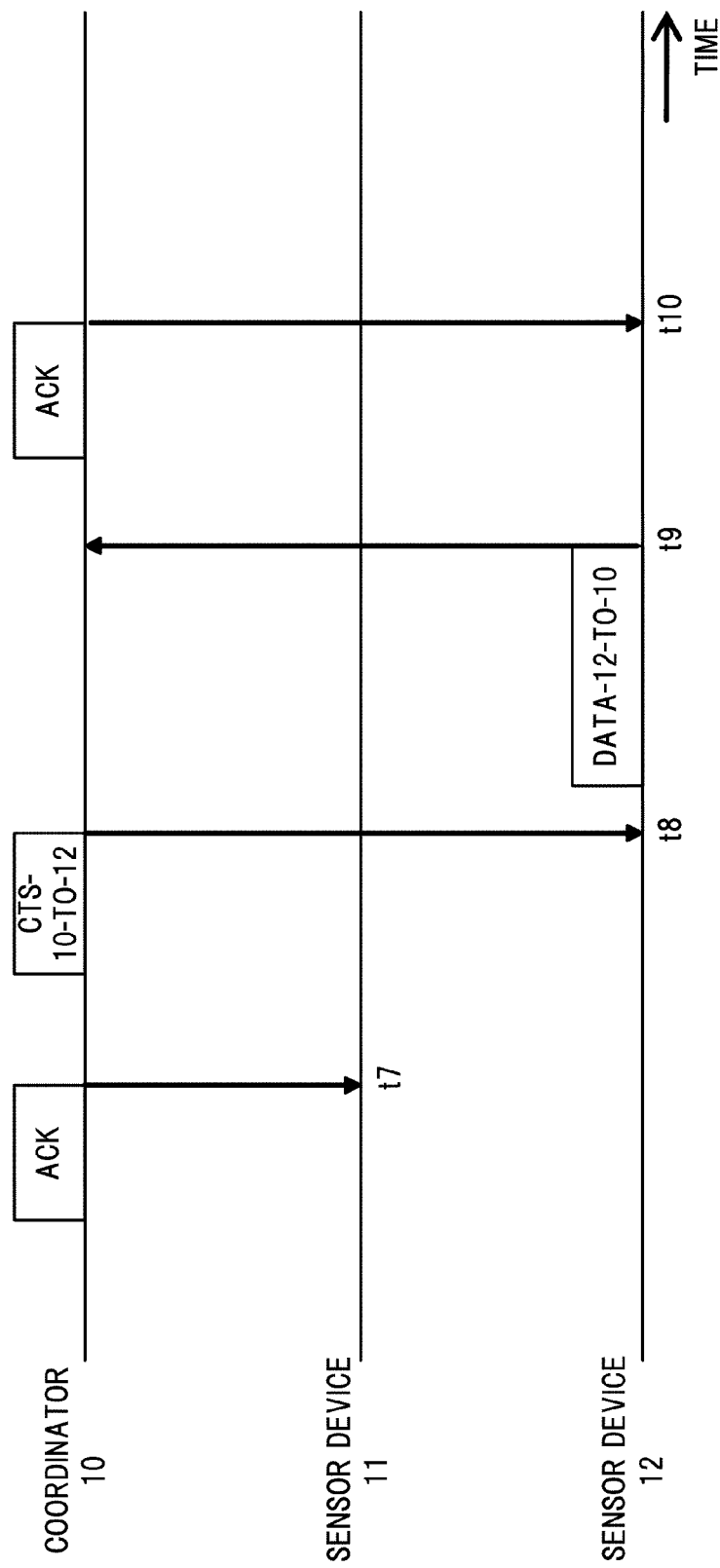
FIG. 12 illustrates the sequence of the communication among the sensor devices and the coordinator.

FIGS. 10 to 12 illustrate a sequence of communication among the sensor devices 11 and 12 and the coordinator 10.

In FIG. 10, the sensor device 12 transmits RTS packets (RTS-12-to-10) for the coordinator 10 at a time t1, and the RTS-12-to-10 packets are received by the sensor device 11.

The sensor device 11 generates data packets including the RTS-12-to-10 packets, and transmits the data packets to the coordinator 10 at a time t2.

The coordinator 10 receives the data packets, retrieves the RTS-12-to-10 packets from the data fields of the data packets, and retains the transmitter address in the transmitter address fields of the RTS-12-to-10 packets in the memory 27.

Next, the sensor device 12 transmits the RTS-12-to-10 packets for the coordinator 10 at a time t3 illustrated in FIG. 11. Moreover, the sensor device 11 transmits RTS packets (RTS-11-to-10 packets) for the coordinator 10 at a time t4.

Figure 13:
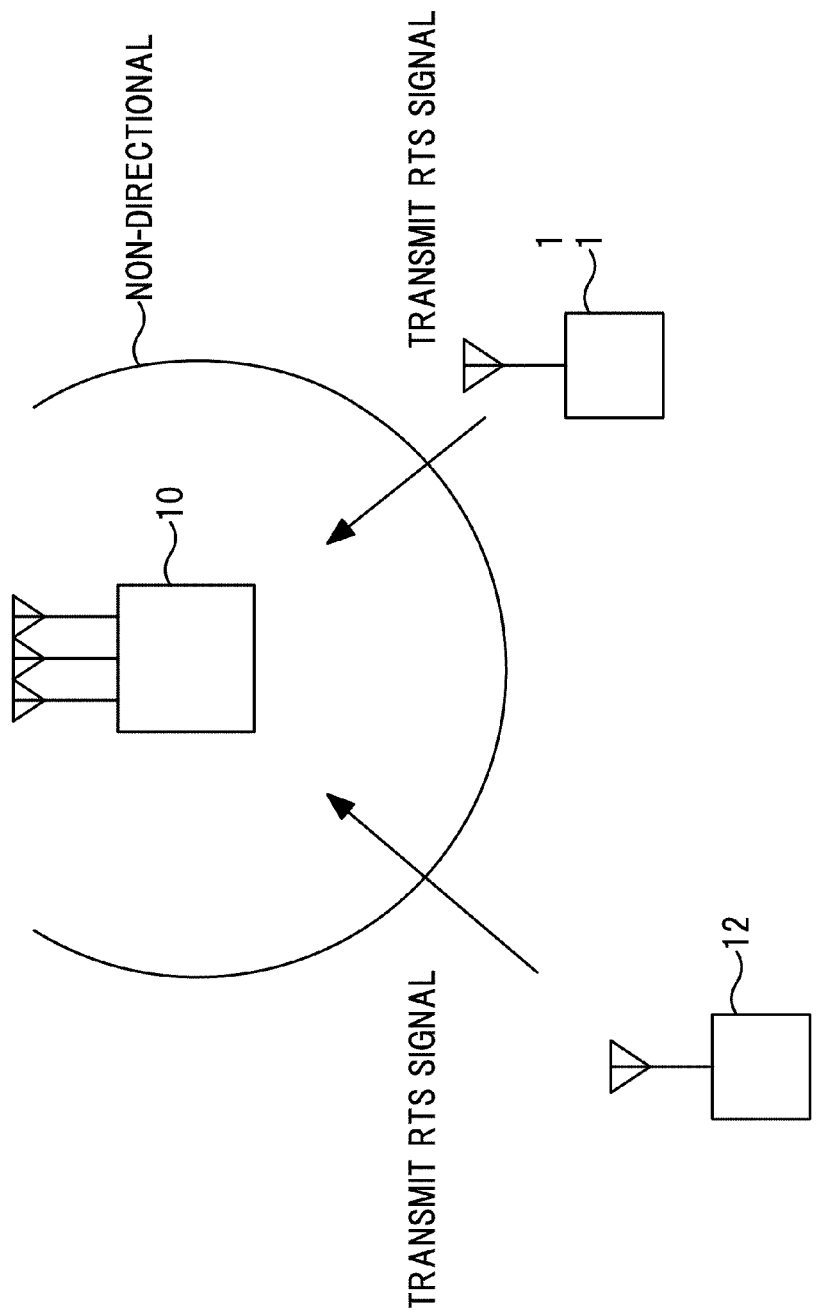
FIG. 13 illustrates the coordinator, whose array antenna is set to be non-directional.

At this time, the coordinator 10 receives the RTS-12-to-10 packets and the RTS-11-to-10 packets by setting the array antenna 21 to be non-directional (or by beam scanning) as illustrated in FIG. 13.

When the RTS packets from the sensor devices 11 and 12 are received by the coordinator 10, the coordinator 10 calculates weights for optimally receiving the RTS packets from the sensor devices 11 and 12. Subsequently, the obtained weights are supplied to the weight controller 22 so that the directivity of the array antenna 21 is set to face the plurality of sensor devices 11 and 12 as illustrated in FIG. 14.

Next, the coordinator 10 generates CTS packets (CTS-10-to-11 packets) for the RTS-11-to-10 packets from the sensor device 11, and transmits the CTS packets to the sensor device 11 at a time t5. The sensor device 11 that has received the CTS-10-to-11 packets generates data packets (DATA-11-to-10 packets), and transmits the data packets to the coordinator 10 at a time t6. The coordinator 10 that has received the DATA-11-to-10 packets transmits acknowledgements (ACK packets) to the sensor device 11 at a time t7.

Similarly, the coordinator 10 generates CTS packets (CTS-10-to-12 packets) for the RTS-12-to-10 packets from the sensor device 12, and transmits the CTS packets to the sensor device 12 at a time t8. The sensor device 12 that has received the CTS-10-to-12 packets generates data packets (DATA-12-to-10 packets), and transmits the data packets to the coordinator 10 at a time t9. The coordinator 10 that has received the DATA-12-to-10 packets transmits ACK packets to the sensor device 12 at a time t10.

When the coordinator 10 receives packets by setting the array antenna 21 to be non-directional (or by beam scanning), the RTS-12-to-10 packets from the sensor device 12 may not be received in some cases. In this case, the data packets of the sensor device 12 are transmitted from the sensor device 12 to the coordinator 10 by being set in the data fields of the data packets generated by the sensor device 11.

When the data packets of the sensor device 12 are transmitted from the sensor device 12 to the coordinator 10 by being set in the data fields of the data packets generated by the sensor device 11, the power consumption of the sensor device 11 is increased (for example, approximately doubled) since the sensor device 11 performs both transmission and reception.

According to the above-described embodiments, however, the sensor device 12 may be wirelessly connected to the coordinator 10 separately from the sensor device 11 as illustrated in FIGS. 10 to 12 in many cases. Therefore, the sensor device 11 does not need to relay the data packets of the sensor device 12 to the coordinator 10, and the power consumption of the sensor device 11 may be reduced.

Moreover, according to the above-described embodiments, the sensor device 11 may be set to a sleep mode as appropriate without any consideration of the data packets from the sensor device 12 since the sensor device 11 does not need to relay the data packets of the sensor device 12 to the coordinator 10 in many cases. This also leads to a reduction in the power consumption.

According to the above-described embodiments, an unconnected sensor device may be wirelessly connected to an information gathering apparatus that is wirelessly connected to a sensor device via an adaptive array antenna.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A wireless sensor network system comprising:
a plurality of sensor devices each having a non-directional antenna; and
an information gathering apparatus having an adaptive array antenna and gathering information detected by the plurality of sensor devices, wherein
the wireless sensor network system wirelessly connects the plurality of sensor devices to the information gathering apparatus,
each sensor device of the plurality of sensor devices includes a transmitter to transmit a transmission request for connecting to the information gathering apparatus, and
the information gathering apparatus includes,
a directivity-changing section configured to set the adaptive array antenna to be non-directional and to change a directivity of the adaptive array antenna in accordance with whether the transmission request was transmitted from at least one of an unconnected sensor device and an unconnected sensor device via a connected sensor device, wherein the directivity-changing section is further configured to determine whether the transmission request was transmitted from one of an unconnected sensor device or from an unconnected sensor device via a connected sensor device, and to change the directivity of the adaptive array antenna to be a directional pattern when it is determined that the transmission request was transmitted from a connected sensor, and wherein the directivity-changing section is configured to set the adaptive array antenna to be non-directional when it is determined that the transmission request was transmitted from an unconnected sensor device via a connected sensor device.

2. The wireless sensor network system according to claim 1, wherein a sensor device of the plurality of sensor devices includes a controller to control transmission power of the sensor device in accordance with information indicating a reception state of a signal transmitted by the information gathering apparatus.

3. The wireless sensor network system according to claim 1, wherein the information gathering apparatus includes a retaining section to retain address information indicating addresses of the at least one of the unconnected sensor device and the unconnected sensor device via the connected sensor device, whose transmission request has been received by the information gathering apparatus.

4. The wireless sensor network system according to claim 1, wherein a sensor device of the plurality of sensor devices includes a retaining section to retain address information indicating an address of another sensor device whose transmission request has been received by the sensor device.

5. The wireless sensor network system according to claim 1, wherein the sensor devices of said plurality are wirelessly connected to the information gathering apparatus having said adaptive array antenna, and wherein each sensor device is configured to transmit detected information to the information gathering apparatus, each sensor device comprising:
a transmitter that is configured to transmit said transmission request for connecting to the information gathering apparatus, and
an incorporating section to incorporate a transmission request from another sensor device into a signal being transmitted from the sensor device upon receiving the transmission request from the other sensor device, and to transmit the signal to the information gathering apparatus.

6. The wireless sensor network system according to claim 5, said sensor device further comprising:
a controller to control transmission power of the sensor device in accordance with information indicating the reception state of the signal transmitted from the information gathering apparatus.

7. The wireless sensor network system according to claim 6, said sensor device further comprising:
a retaining section to retain address information indicating an address of the other sensor device whose transmission request has been received by the sensor device.

8. The wireless sensor network system according to claim 1, wherein the directivity-changing section is further configured to change the directivity of the adaptive array antenna in accordance with a reception state of the signal transmitted from the at least one of the unconnected sensor device and the unconnected sensor device via the connected sensor device.

9. A wireless sensor network system comprising:
a plurality of sensor devices each having a non-directional antenna; and
an information gathering apparatus having an adaptive array antenna and gathering information detected by the plurality of sensor devices, wherein
the wireless sensor network system wirelessly connects the plurality of sensor devices to the information gathering apparatus,
each sensor device of the plurality of sensor devices includes a transmitter to transmit a transmission request for connecting to the information gathering apparatus, and
the information gathering apparatus includes,
a directivity-changing section configured to set the adaptive array antenna to be non-directional and to change a directivity of the adaptive array antenna in accordance with whether the transmission request was transmitted from at least one of an unconnected sensor device and an unconnected sensor device via a connected sensor device, wherein the directivity-changing section is further configured to determine whether the transmission request was transmitted from one of an unconnected sensor device or from an unconnected sensor device via a connected sensor device, and to change the directivity of the adaptive array antenna to be a directional pattern when it is determined that the transmission request was transmitted from a connected sensor, and wherein the directivity-changing section is configured to set the adaptive array antenna to be non-directional when it is determined that the transmission request was transmitted from an unconnected sensor device via a connected sensor device,
wherein a sensor device of the plurality of sensor devices includes an incorporating section to incorporate a transmission request from another sensor device of the plurality of sensor devices into a signal being transmitted from the sensor device upon receiving the transmission request from the other sensor device, and to transmit the signal to the information gathering apparatus, and
the information gathering apparatus includes a retrieving section to retrieve a new transmission request from the unconnected sensor device included in the signal transmitted from the connected sensor device.

10. A wireless sensor network information gathering apparatus that is wirelessly connected via an adaptive array antenna to a plurality of sensor devices each having a non-directional antenna, and that is configured to gather information detected by the plurality of sensor devices, the apparatus comprising:
a directivity-changing section configured to set the adaptive array antenna to be non-directional and to change a directivity of the adaptive array antenna in accordance with whether a transmission request was transmitted from at least one of an unconnected sensor device and an unconnected sensor device via a connected sensor device, wherein the directivity-changing section is further configured to determine whether the transmission request was transmitted from one of an unconnected sensor device or from an unconnected sensor device via a connected sensor device, and to change the directivity of the adaptive array antenna to be a directional pattern when it is determined that the transmission request was transmitted from a connected sensor, and wherein the directivity-changing section is configured to set the adaptive array antenna to be non-directional when it is determined that the transmission request was transmitted from an unconnected sensor device via a connected sensor device; and
a transmitter/receiver for connecting to the adaptive array antenna.

11. The information gathering apparatus according to claim 10, further comprising:
a retaining section to retain address information indicating addresses of the at least one of the unconnected sensor device and the unconnected sensor device via the connected sensor device, whose transmission request has been received by the information gathering apparatus.

12. The information gathering apparatus according to claim 10, wherein the directivity-changing section is further configured to change the directivity of the adaptive array antenna in accordance with a reception state of the signal transmitted from the at least one of the unconnected sensor device and the unconnected sensor device via the connected sensor device.

13. A wireless sensor network information gathering apparatus that is wirelessly connected via an adaptive array antenna to a plurality of sensor devices each having a non-directional antenna, and that is configured to gather information detected by the plurality of sensor devices, the apparatus comprising:
a directivity-changing section configured to set the adaptive array antenna to be non-directional and to change a directivity of the adaptive array antenna in accordance with whether a transmission request was transmitted from at least one of an unconnected sensor device and an unconnected sensor device via a connected sensor device, wherein the directivity-changing section is further configured to determine whether the transmission request was transmitted from one of an unconnected sensor device or from an unconnected sensor device via a connected sensor device, and to change the directivity of the adaptive array antenna to be a directional pattern when it is determined that the transmission request was transmitted from a connected sensor, and wherein the directivity-changing section is configured to set the adaptive array antenna to be non-directional when it is determined that the transmission request was transmitted from an unconnected sensor device via a connected sensor device; and
a retrieving section to retrieve a new transmission request from the unconnected sensor device included in the signals transmitted from the connected sensor device.

14. A connection method for use in a wireless sensor network, the method comprising:
- wirelessly connecting a plurality of sensor devices each having a non-directional antenna to an information gathering apparatus having an adaptive array antenna;
- gathering information detected by the plurality of sensor devices in the information gathering apparatus; and
- setting the adaptive array antenna to be non-directional and changing a directivity of the adaptive array antenna in accordance with whether a transmission request was transmitted from at least one of the unconnected sensor device and the unconnected sensor device via a connected sensor device, by the information gathering apparatus, the method further including
- determining whether the transmission request was transmitted from one of an unconnected sensor device or from an unconnected sensor device via a connected sensor device,
- changing the directivity of the adaptive array antenna to be a directional pattern when it is determined that the transmission request was transmitted from a connected sensor, and
- setting the adaptive array antenna to be non-directional when it is determined that the transmission request was transmitted from an unconnected sensor device via a connected sensor device.

15. The connection method for use in the wireless sensor network according to claim 14, the method further comprising:
- controlling transmission power of the plurality of sensor devices in accordance with information indicating a reception state of the signal transmitted from the information gathering apparatus.

16. The connection method for use in the wireless sensor network according to claim 14, the method further comprising:
- retaining address information in the information gathering apparatus, the address information indicating addresses of the at least one of the unconnected sensor device and the unconnected sensor device via the connected sensor device, whose transmission request has been received by the information gathering apparatus.

17. The connection method for use in the wireless sensor network according to claim 14, the method further comprising:
- retaining address information in each sensor device of the plurality of sensor devices, the address information indicating an address of another sensor device whose transmission request has been received by the sensor device.

18. The connection method for use in the wireless sensor network according to claim 14, the method further comprising:
- changing the directivity of the adaptive array antenna in accordance with the reception state of the signal transmitted from the at least one of the unconnected sensor device and the unconnected sensor device via the connected sensor device.

19. A connection method for use in a wireless sensor network, the method comprising:
- wirelessly connecting a plurality of sensor devices each having a non-directional antenna to an information gathering apparatus having an adaptive array antenna;
- gathering information detected by the plurality of sensor devices in the information gathering apparatus;
- setting the adaptive array antenna to be non-directional and changing a directivity of the adaptive array antenna between a directional pattern and a non-directional pattern in accordance with whether a transmission request was transmitted from at least one of the unconnected sensor device and the unconnected sensor device via a connected sensor device, by the information gathering apparatus; and
- notifying the information gathering apparatus of the transmission request of the unconnected sensor device via a connected sensor device.

* * * * *